(No Model.) 2 Sheets—Sheet 1.
H. S. TEAL.
BRAKE HANDLE.
No. 531,577. Patented Dec. 25, 1894.
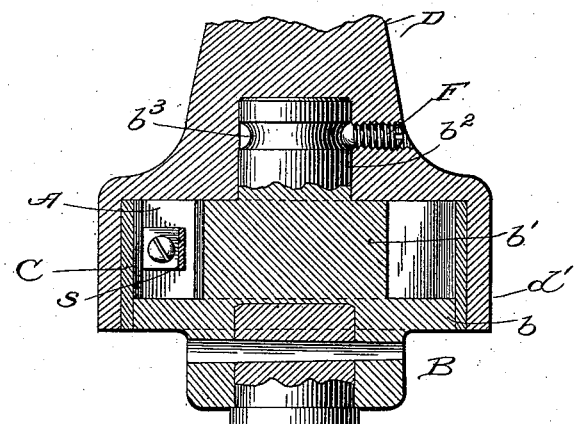
Fig. 1.
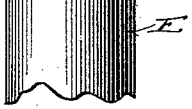
Fig. 2. Fig. 3.
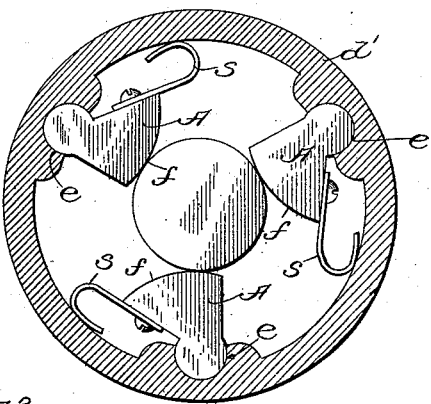
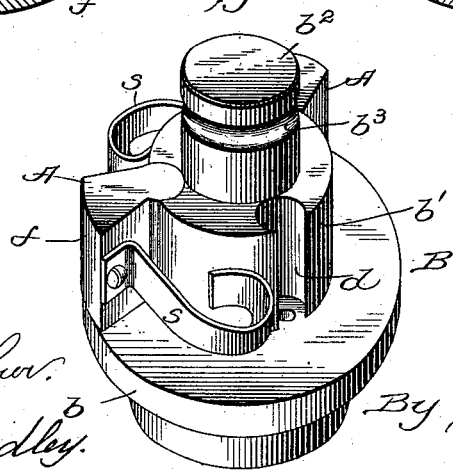
Fig. 4.
Witnesses:
Harry T. Rohrer.
Herbert Bradley.
Inventor:
Henry S. Teal,
By Howard T. Howard,
Attys.

(No Model.)  H. S. TEAL.  2 Sheets—Sheet 2.
BRAKE HANDLE.

No. 531,577. Patented Dec. 25, 1894.

Witnesses:
Harry S. Prince
Herbert Bradley.

Inventor:
Henry S. Teal,
By W. T. Howard
Attys

UNITED STATES PATENT OFFICE.

HENRY S. TEAL, OF CHICAGO, ILLINOIS, ASSIGNOR TO THE ADAMS & WESTLAKE COMPANY, OF ILLINOIS.

BRAKE-HANDLE.

SPECIFICATION forming part of Letters Patent No. 531,577, dated December 25, 1894.

Application filed July 21, 1894. Serial No. 518,211. (No model.)

*To all whom it may concern:*

Be it known that I, HENRY S. TEAL, of Chicago, in the county of Cook and State of Illinois, have invented certain new and useful Improvements in Brake-Handles, of which the following is a specification, reference being had to the accompanying drawings and to the letters of reference marked thereon.

This invention relates to that class of brake handles for use on street or other cars, which, when given a rotary movement in one direction, grip or bite upon the brake staff or rod, or a part rigidly attached thereto, thereby imparting to the brake staff its rotary motion, and causing the brakes to be set; but which handle, when the direction of its rotation is changed, shall turn upon the brake staff without rotating the latter; and the invention consists in combining, with the brake handle and brake staff, gripping jaws having curved operative faces, struck from centers eccentrically arranged with reference to their centers of oscillation, as hereinafter more fully set forth.

Figure 5:
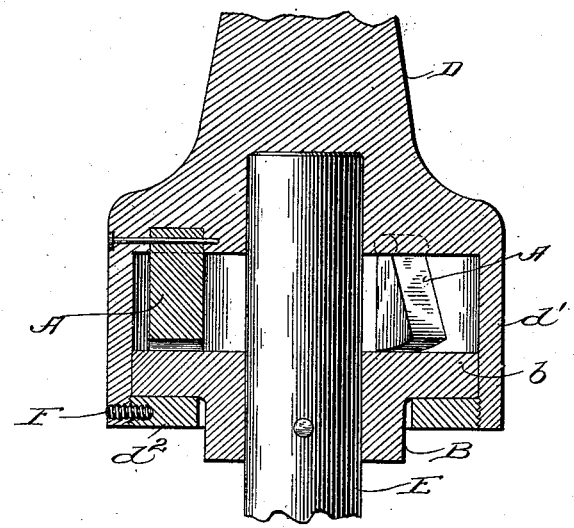
Figure 6:
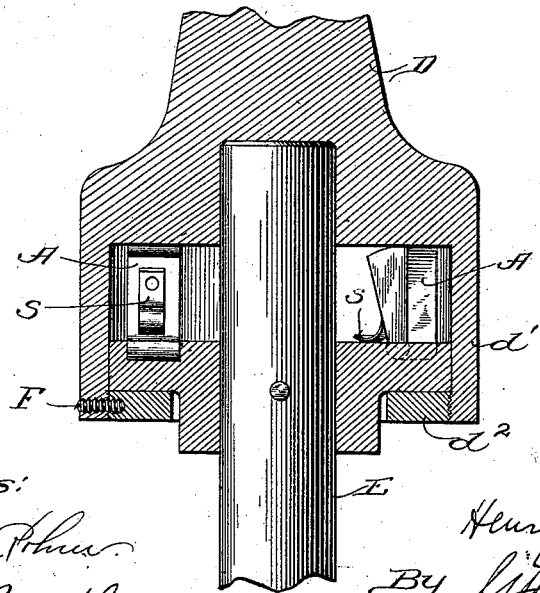

In the accompanying drawings, Figure 1 is a view, chiefly in vertical section, of my invention as applied to the upper end of a brake staff. Fig. 2 is a plan, partly in section, showing one form of the invention. Fig. 3 is a similar plan showing a modification. Fig. 4 is a detached detail hereinafter described. Figs. 5 and 6 show further modifications.

Similar letters of reference indicate similar parts in the respective figures.

E represents the brake staff or rod upon which the brake chain is wound.

Referring to Figs. 1 and 2, B is a hub, also shown detached in Fig. 4, which, when in place, is rigidly attached to or forms a part of the brake staff E. The hub B is provided with a flange $b$, a boss $b'$ and an upper pin $b^2$, all preferably homogenous and made of steel. It is evident, however, that the pin $b^2$ may be separate from the boss $b'$. The pin $b^2$ is furnished with an annular groove $b^3$, for a purpose hereinafter described.

The boss $b'$ is recessed at $d$ to receive a series of hardened steel gripping jaws A, one of which is removed from Fig. 4. The outer curved face $f$ of each gripping jaw is eccentric with the center of rotation $c$, being struck or described as from a point $c'$, Fig. 2. To each gripping jaw A is screwed, or otherwise attached, a curved plate spring $s$, while the free end of said springs bear against the boss $b'$ of the hub B, to insure contact between the outer faces of the jaws and the surface which they are intended to engage. Any suitable form of spring may be used as a substitute for that shown.

D. is the brake handle, having at its lower end a socket $d'$, which fits over the flange $b$ of the hub B, so as to be rotatable thereon, and which socket incloses the gripping jaws A. The handle D is also provided with a bore or bearing which receives the upper end of the pin $b^2$. A screw F is passed through the side of the handle D, the pointed end of the screw entering the groove $b^3$, in the pin $b^2$, in order that the handle may turn upon the said pin and yet be incapable of detachment therefrom while in operation, but still readily removable at pleasure, as will be understood.

The socket of the handle D is or may be provided with a steel bushing or lining C inserted therein, its office being to furnish a durable wearing surface against which the gripping jaws A shall work.

In operation, the handle D, carrying the socket $d'$, being rotated, say to the right, or in the direction of the arrow, Fig. 2, the face $f$ of each jaw A is held by its springs $s$ in contact with the inner face of the steel bushing or lining C, and is carried by friction in the direction in which the handle is moved. By this forward movement of the jaws A upon their centers $c$, successive points of their faces $f$ are progressively brought in contact with the inner face of the steel bushing or lining C. As the faces of the jaws are so eccentric to their centers of oscillation, that each successive point of contact is farther from the center of oscillation than its predecessor the result is that each jaw A effects a grip upon the handle, or will jam between the inner face of the bushing or lining C and the hub B, compelling the hub B and the brake staff E to move with the handle D. Upon reversing the direction of the brake handle, the jaws A will at once recede from their gripping position, and permit the handle to be moved independently of the hub B and the brake staff E, thus preparing it for another operative hold. The reversal of the brakes, it will be understood, results from the release of the brake staff in the ordinary way, allowing the brake chain to unwind.

While the socket of the handle is shown provided with a steel bushing or lining, which construction is preferred, the bushing may be omitted, and the jaws A caused to engage the inner surface of the socket itself. As the oscillatory movement of the jaws A is almost imperceptible, there is practically no movement of the springs $s$, and the slight strain on them being constant there is no tendency to fracture.

In Fig. 3 is shown a modification of my invention, in which the same principle of operation is carried out, though upon a modified plan. As shown in Fig. 3, the jaws A are reversed, having their bearings and points of rotation formed in projections $e$, extending from the socket $d'$, and the operative faces of the said jaws acting directly upon the brake staff E, or some extension thereof rigidly attached thereto.

In Fig. 5, the jaws A are shown in a vertical instead of a horizontal position, and adapted to jam between the handle and the hub B, a thrust collar $d^2$ being screwed into the bottom of the handle socket, and prevented from displacement by means of the screw F. In the use of this form of invention, no springs are required, gravity keeping the jaws A always in position to engage.

In Fig. 6, the jaws A occupy a position the reverse of that found in Fig. 5, they being socketed in the hub B, and adapted to bite against the horizontal inner face of the handle socket. The construction of Fig. 6 requires springs $s$ to keep them in contact ready to engage.

This invention in either of its forms, provides a simple, strong and efficient device for the purpose mentioned, and is of comparatively inexpensive construction.

Certain details of construction may be changed without departing from the main features of my invention.

I do not restrict myself to the number of jaws, or to the mode in which they are hinged, or to the exact curvature of their operative faces, or to the character of the springs when employed which assist them in their operation, as these features of construction may be varied by exercising the ordinary skill of the mechanic; but—

Having described my invention, I claim—

1. In combination with a brake handle having a lower socket, and a brake staff, a series of oscillating gripping jaws within said socket, each having a curved face eccentric with the center of oscillation of the jaw, substantially as set forth.

2. In combination with a brake handle having a lower socket, and a brake staff, a series of oscillating gripping jaws within said socket, each having a curved face eccentric with the center of oscillation of the jaw, and springs for insuring contact between the operative faces of said jaws and the surface which they are adapted to engage, substantially as set forth.

3. In combination with a brake handle having a socket and a steel bushing or lining, and a brake staff, a series of oscillating gripping jaws within said bushed socket, each having a curved face eccentric with the center of oscillation of the jaw, substantially as set forth.

4. In combination with a brake handle having a lower socket, and a brake staff, a series of oscillating gripping jaws within said socket each having a curved face eccentric with the center of oscillation of the jaw, and means, substantially as described, for preventing disengagement of the handle from the brake staff during operation, yet admitting of the rotation of the handle upon or around said staff, substantially as set forth.

In testimony whereof I hereto set my hand and seal.

HENRY S. TEAL. [L. S.]

Witnesses:
F. W. GEO. PHILLIPS,
A. HENRY GIS.